No. 675,308. Patented May 28, 1901.
J. M. VOSS.
HOSE LEAK STOP.
(Application filed Sept. 5, 1900.)
(No Model.)

WITNESSES:
Ernest R. Creeth
Mattie McGinnis

INVENTOR
James M. Voss
BY Hazard & Harpham
ATTORNEYS.

UNITED STATES PATENT OFFICE.

JAMES M. VOSS, OF LOS ANGELES, CALIFORNIA, ASSIGNOR OF ONE-HALF TO CHARLES L. EGGERS, JOSEPH HANSARD, ALBERT PRYOR, AND JOHN GALETICH, OF SAME PLACE.

HOSE LEAK-STOP.

SPECIFICATION forming part of Letters Patent No. 675,308, dated May 28, 1901.

Application filed September 5, 1900. Serial No. 29,106. (No model.)

*To all whom it may concern:*

Be it known that I, JAMES M. VOSS, a citizen of the United States, residing at Los Angeles, county of Los Angeles, State of California, have invented new and useful Improvements in Hose Leak-Stops, of which the following is a specification.

My invention relates to devices for stopping leaks in garden and other hose; and the objects thereof are to provide a simple and inexpensive device that is easily attached to the hose over the leak and which will stop the leak without diminishing the flow of water through the hose. I accomplish these objects by the device described herein and illustrated in the accompanying drawings, forming a part hereof, in which—

Figure 1:
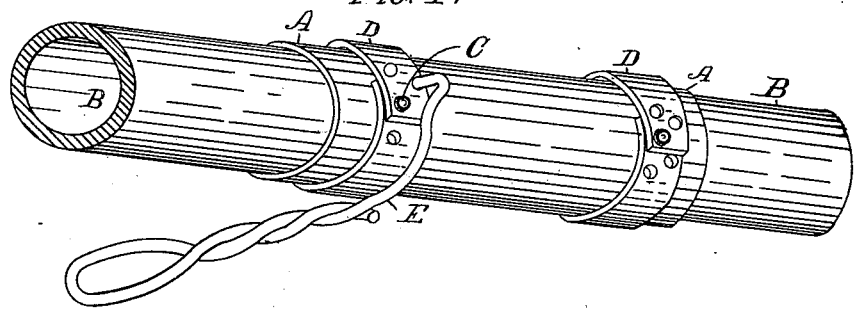
Figure 2:
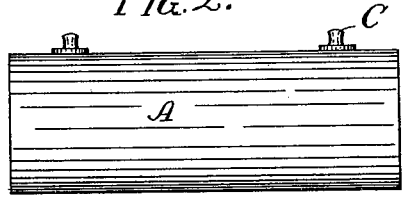
Figure 3:
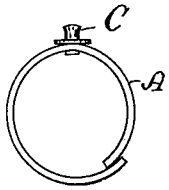
Figure 5:
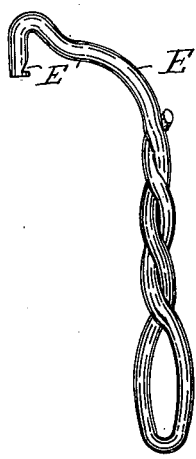
Figure 4:
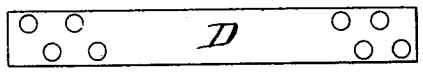

Figure 1 is a perspective view of a piece of hose with my leak-stop in place thereon, with the attaching-wrench ready to be removed therefrom. Fig. 2 is a side elevation of my leak-stop. Fig. 3 is an end view of the same. Fig. 4 is a plan view of the binding-strap which holds the jacket on the hose. Fig. 5 is a perspective view of the lever with which the binding-strap is fastened upon the jacket to secure it upon the hose.

Heretofore the leak-stop appliances for stopping leaks in garden-hose have usually consisted of appliances which were placed in the bore of the hose, thereby rendering it necessary to cut the hose at the place of the leak and removing the defective part and then inserting a tubular contact-piece which would hold the several parts together and not permit the water to escape. These devices cause the loss of a portion of the hose, and the device obstructs the flow of water through the hose, which is objectionable. With my leak-stop these objections are overcome.

In the drawings, A is the jacket, preferably made of metal, bent so that the edges lap when on the hose B. Jacket A is provided with studs C, one at each end, preferably opposite the lap, upon which the binding-straps D are fastened to secure the jacket in place on the hose. As each size of hose is made of different thicknesses, I provide binding-strap D with a plurality of holes at the ends, so that a binding-strap designed for any particular size of hose will bind the jacket thereon whether the hose be two-ply or more, the holes being properly adjusted therefor. There may be a plurality of holes at each end, or at one end only, and a single hole at the other.

In the operation of my device the jacket is preferably slipped on the hose at the end and along the same, so that the studs C will be at each end of the leak, which will bring the lap opposite thereto. One of the holes in one end of strap D is then placed on stud C and the binding-strap is bent around the jacket. With wrench E the strap is drawn so as to bring the jacket in water-tight contact with the hose, and the other end of the strap is then slipped over the stud. The other end of the jacket is treated in like manner, which causes the jacket to stop the leak in the hose without its being cut or interfering with the flow of the water therethrough.

By this construction it will be observed that the outer lapping edge of the jacket causes the inner lapping edge thereof to embed itself in the hose and prevents the jacket from rotating on the hose while the binding-strap is being drawn up by lever E. Lever E has a notch E', which holds the end of the lever from slipping out of the binding-strap when drawing the same upon the jacket.

Having described my invention, what I claim as new, and desire to secure by Letters Patent, is—

1. A leak-stop for mending holes in hose, comprising a jacket adapted to encircle the hose, and one part thereof lap upon the other; studs affixed, one, at each end of said jacket; a binding-strap having holes in the ends thereof.

2. The combination of a leak-stop for mending holes in hose, comprising a jacket to encircle the hose, having studs affixed thereto at the ends thereof; a binding-strap having holes in the ends adapted to be fastened upon the jacket and bind it upon the hose; with a hose.

In witness that I claim the foregoing I have hereunto subscribed my name, this 30th day of August, 1900, at Los Angeles, California.

JAMES M. VOSS.

Witnesses:
G. E. HARPHAM,
MATTIE MCGINNIS.